United States Patent [19]

Heidelberg et al.

[11] Patent Number: 5,641,276
[45] Date of Patent: Jun. 24, 1997

[54] ELECTRIC PUMP FOR ENVIRONMENTALLY HAZARDOUS MATERIAL

[75] Inventors: Götz Heidelberg, Starnberg; Peter Ehrhart, Munich, both of Germany

[73] Assignee: Magnet-Motor Gesellschaft für magnetmotorische Technik mbH, Starnberg, Germany

[21] Appl. No.: 290,947

[22] PCT Filed: Feb. 26, 1993

[86] PCT No.: PCT/EP93/00455

§ 371 Date: Dec. 9, 1994

§ 102(e) Date: Dec. 9, 1994

[87] PCT Pub. No.: WO93/17484

PCT Pub. Date: Sep. 2, 1993

[30] Foreign Application Priority Data

Feb. 26, 1992 [DE] Germany ............... 42 05 926.7

[51] Int. Cl.$^6$ ............................................. F04B 35/04
[52] U.S. Cl. ................ 417/423.7; 417/351; 417/423.14; 310/86; 310/156
[58] Field of Search .................. 417/351, 423.7, 417/423.14; 310/62, 63, 89, 156

[56] References Cited

U.S. PATENT DOCUMENTS

| | | | |
|---|---|---|---|
| 1,973,070 | 9/1934 | Hess et al. | 417/351 |
| 2,649,048 | 8/1953 | Pezzillo et al. | 417/423.7 |
| 4,339,874 | 7/1982 | McCarty et al. | |
| 4,639,627 | 1/1987 | Takekoshi et al. | 310/156 |
| 4,877,985 | 10/1989 | Byrd et al. | 310/86 |
| 5,044,897 | 9/1991 | Dorman | 417/423.7 |
| 5,349,258 | 9/1994 | Leupold et al. | 310/156 |

FOREIGN PATENT DOCUMENTS

| | | | |
|---|---|---|---|
| 161712 | 5/1985 | European Pat. Off. . | |
| 282755 | 2/1988 | European Pat. Off. . | |
| 1165880 | 10/1958 | France | 417/423.7 |
| 180478 | 12/1954 | Germany | 417/423.7 |
| 1053647 | 3/1959 | Germany . | |
| 2245009 | 1/1979 | Germany . | |
| 1218724 | 1/1971 | United Kingdom . | |
| 2116373 | 9/1983 | United Kingdom . | |
| 9013937 | 11/1990 | WIPO . | |

Primary Examiner—Charles G. Freay
Attorney, Agent, or Firm—Spencer & Frank

[57] ABSTRACT

An electric pump includes an impeller, a shaft and a motor having at least one permanent magnet rotor and a stator. The impeller is coupled by the shaft to the at least one permanent magnet rotor of the electric motor. A hermetically sealed housing is provided in which the shaft is supported and which has openings for delivery side and suction side connections for material to be pumped. The rotor is disposed inside the housing and the stator of the electric motor is disposed outside the housing. At least one stator carrier is attached to the housing, the stator being mounted in the at least one stator carrier. The at least one stator carrier is of one-piece configuration so as to enclose the housing across an entire circumference thereof in a cup-shaped manner. The at least one stator carrier holds a liquid for cooling the at least one stator.

17 Claims, 3 Drawing Sheets

ELECTRIC PUMP FOR ENVIRONMENTALLY HAZARDOUS MATERIAL

BACKGROUND OF THE INVENTION

1. Field of the Invention

The present invention relates to an electric pump comprising an impeller coupled via a shaft to at least one permanent magnet rotor of an electric motor, and a hermetically sealed housing in which the shaft is supported and which has as sole openings the delivery side and suction side connections for the material to be pumped.

2. Background Information

The present invention specifically relates to powerful pumps having an electrical power in the range of 10 kW and more. When installing such powerful pumps in a piping system, the drive for the pump unit proper is provided in the form of a motor flange-mounted to the outside of the pump housing.

Pump aggregates with a power in the above-indicated range are heavy and bulky. They require specific support on a foundation. Direct, freely supported integration in the piping system is not possible with the known pumps.

There are specific legal regulations concerning the design of pumps, in particular pumps used for environmentally hazardous fluids. It must be ensured that leakage of environmentally hazardous fluids is prevented. This leads to specific problems with respect to the sealing of the shaft passage. In the known pumps, the rotary shaft left the pump housing at at least one location of the housing. This is where special sealing measures must be taken.

There was already suggested an electric pump of the type indicated at the outset, in which measures are taken for preventing that the shaft extends out of the pump housing. To this end, the known electric pump is provided with a housing enclosing the electric motor, the drive shaft and the pump impeller located on the drive shaft. This pump complies with the legal requirements and avoids complex sealing measures; for, as the shaft does not leave the housing at any location, the pumping material has virtually no possibility to get out of the housing.

SUMMARY OF THE INVENTION

It is the object of the invention to make available an electric pump of the type indicated at the outset which may easily be installed in piping systems without any specific supports and which, furthermore, reliably prevents the leakage of pumping material by avoiding shaft passages or lead-outs in the housing.

This object is met in that the rotor is disposed inside the housing and the stator parts of the stator of the electric motor are disposed outside the housing.

The invention starts from the realization that first and above all care must be taken that the shaft driving the pump impeller does not extend out of the housing at any location. While the prior suggestion in this respect provided that the entire electric motor together with shaft and impeller, but without control electronics, were accommodated in the housing, the present invention still takes one step further: of the electric motor, only the permanent magnet rotor is disposed inside the housing, whereas the stator is located outside the housing. This measure yields an even more compact construction of the housing on the one hand and provides more freedom with respect to the stator design on the other hand.

The stator parts of the stator of course must be positioned such that an interaction can take place between stator and rotor. In a specific embodiment, the invention provides that the rotor consists of radially oriented permanent magnet poles of alternating polarity which are distributed across the shaft circumference, and that the stator, in the form of a ferromagnetic ring axially aligned with the rotor and having coil windings, is supported on the outside of the housing wall.

In the simplest configuration, there is provided only one single rotor in conjunction with one single stator. For increasing the driving power, it is also possible to provide several rotors on the drive shaft in axially offset manner, with a corresponding number of stators being then provided outside of the housing.

Of course, an as small as possible gap should be present between the outer circumference of the rotor and the inner circumference of the stator. To this end, the housing is designed to be as thin as possible between rotor and stator. According to the invention, the thickness of the housing between rotor and stator is below 10 mm, preferably below 5 mm.

The housing may consist virtually of one cast member. For reasons of production engineering, an e.g. approximately cylindrical housing can be produced split into two longitudinal halves, with the longitudinal halves, upon mounting of the parts in the housing, being welded together or connected by screws or bolts.

However, it is also possible to provide different materials in various portions of the housing by producing the housing of several parts to be axially joined together. Preferably, the material of the housing is ceramics or a non-ferromagnetic steel of low electrical conductivity. In case of a two-part design of the housing in axial direction, preferably cast steel or cast iron is provided for the housing in the region of the impeller, whereas ceramics or non-ferromagnetic steel of low electrical conductivity is preferred in the region of the electric motor.

For holding the permanent magnet poles on the rotor, a thin band or hoop is preferably provided on the outer circumference of the rotor, e.g. of fiber-reinforced plastics material or a non-ferromagnetic steel of low electrical conductivity.

For reasons of construction on the one hand and for reasons of long lifetime on the other hand, the shaft may be supported in different ways within the housing.

In one modification, the shaft is supported on both sides of the impeller, whereas the rotor is disposed in cantilever fashion. This means: the shaft is supported e.g. at an end of the housing remote from the rotor and in a central housing portion, with the impeller being fixedly mounted on the shaft between these two bearings. On the side of the bearing opposite the impeller, the shaft projects a certain distance from the bearing, and the rotor or rotors are attached to this free end of the shaft.

When several rotors and stators are provided, these may also be disposed symmetrically on both sides of the impeller.

Simple assembly is achieved in that the stator parts are mounted in a stator carrier that is attached to the housing. It is also possible to mount the stator parts on two stator carriers which are attached to a housing flange of the housing on both sides thereof. The stator carriers are prefabricated parts e.g. of plastics material or a non-ferromagnetic steel, with the stator ring together with its coil windings being firmly threaded to the stator carrier. The stator carrier in turn may then be attached to a radial flange of the housing by means of circumferentially distributed bolts or screws.

Especially in case of the cylindrical casing, the stator carrier should enclose the housing across the entire circumference thereof, preferably also on a face side, in cup-shaped manner.

It is rendered possible by the invention to design the current supply means to the coil windings of the stator without specific measures, since a housing passage is not necessary. Furthermore, it is possible without specific expenditure to provide a cooling means, preferably a liquid cooling means, for the stator.

A particularly compact construction is achieved when the outer diameter of the rotor (unless otherwise indicated, the term "rotor" as used herein also comprises the embodiment with several rotors disposed axially beside each other) is greater or at the most equal to the length of the permanent magnet poles of one single rotor in axial direction. The diameter of the impeller or of the housing on the pump side should be about equal to the outer diameter of the stator carrier.

For obtaining high power of the motor, the permanent magnet poles on the rotor should be formed of radially magnetized, highly coercive permanent magnets of the rare earths metal type with a ferromagnetic return path disposed radially inside.

As an alternative, the invention provides that the permanent magnet poles on the rotor are formed by circumferentially magnetized, highly coercive permanent magnets of the rare earths metal type and ferromagnetic flux wedges according to the flux collecting principle.

These ferromagnetic flux wedges will still be elucidated in more detail hereinafter. The permanent magnets of the rotor are of somewhat trapezoidal configuration in a cross-section perpendicular to the rotor axis, with the shorter side of the two parallel trapezoid sides being disposed radially outside. The permanent magnets are oriented in circumferential direction, with a north pole of a particular magnet being located opposite a south pole of an adjacent magnet, and vice versa. Between two adjacent permanent magnets there is provided a flux wedge of triangular cross-section, having its base line arranged radially outside. This base line is less than half of the radial height of the individual magnets. This results in a concentration of the force lines leaving the rotor surface in radial direction.

The coil windings are disposed in grooves within the ferromagnetic ring. Commutation within the coil windings of the stator takes place electronically. The power and/or speed of the pump is infinitely variable within the operating range thereof.

In addition to the modification with circumferentially distributed permanent magnets of the rotor and stator parts disposed radially outside of the rotor, the invention also provides a different modification of an electric motor. This modification distinguishes itself in that the rotor consists of a number of sector-shaped permanent magnet poles configured in the form of a disc and having an axial field orientation, and that the stator is disposed on the face side of the housing and has a number of coil windings disposed substantially in one plane, with the number thereof corresponding substantially to the pole number of the rotor.

As position indicator system, it is possible to provide a resolution system operating on the basis of induction or a system composed of Hall probes and rotating control magnets.

Embodiments of the invention will now be elucidated in more detail with reference to the drawings in which

DETAILED DESCRIPTION OF THE PREFERRED EMBODIMENTS

Figure 1:
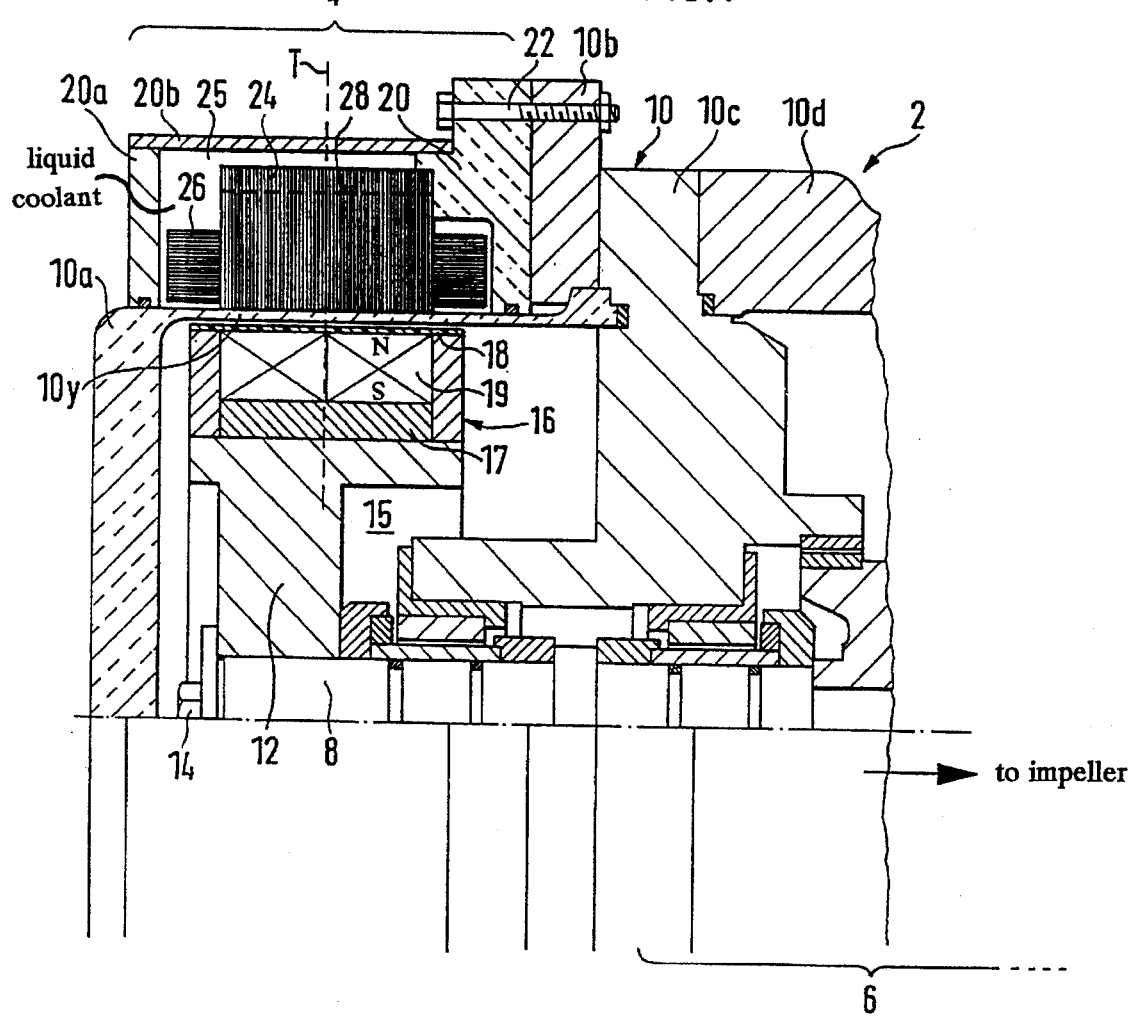
FIG. 1 shows a longitudinal sectional view of a part of an electric pump, with the pump part with the impeller being omitted.

FIG. 1 shows a longitudinal sectional view of an electric pump 2, illustrating only the drive part in conjunction with the housing. To the right in FIG. 1, the electric motor drive part 4 is followed by a pump part 6 having its impeller (not shown) arranged on a shaft 8. The construction of the pump part is known per se and will again be briefly explained hereinafter in connection with FIG. 3.

A (pump) housing 10 is composed of several housing parts: in the region of the electric motor drive part 4 there is provided an approx. cup-shaped housing part 10a of ceramic material, which on the outside of its free end is followed by an annular flange 10b and then by a central part 10c. This central part 10c, like the annular flange 10b and the housing part 10d following to the right, consists of cast iron or cast steel.

The shaft 8 is rotatably supported in a through bore of housing part 10c. With respect to its supporting location or bearing, the shaft projects to the left into a housing chamber 15 where a rotor 12 is attached to the free end thereof by means of a fastening screw 14.

The rotor consists of an annular part of non-ferromagnetic steel and carries on its circumference a predetermined number of permanent magnets 19 below which means 17 for forming a ferromagnetic return path are provided, so as to form permanent magnet poles 16. On the outer circumference, the permanent magnet poles 16 are held by a band 18 of fiber-reinforced plastics material.

Between the outer surface of rotor 12, i.e. between the outside of the band 18, and the inner surface of the cylinder-shell-shaped section 10y of housing part 10a there is just a very small air gap.

On the outside of the cylinder-shell-shaped section 10y of housing part 10a, there is disposed a ring 24 consisting of ferromagnetic material and surrounding the entire housing part 10a across the circumference thereof.

The ferromagnetic ring 24 contains a number of coil windings 26 corresponding approx. to the number of pole pairs of the rotor 12.

The ring 24 is axially mounted on a coil carrier 20 consisting e.g. of plastics material or non-ferromagnetic steel, by means of screws outlined by broken lines 28. The coil carrier 20 in turn is attached to the annular flange 10b by means of circumferentially distributed screws 22.

The coil carrier 20 has an outer radial wall 20a. The chamber 25 receiving the ring 24 with the coil windings 26 is closed on the outside by a cover 20b.

Introduced into the chamber 25 is a cooling liquid (by means not shown herein).

The connections for the coil windings are not shown in the drawing. The electronic control system for the rotor is provided outside of the housing as a whole, at a remote location.

By electronic commutation the stator currents within the coil windings are controlled—as usual with electric motors—such that rotor 12 and thus shaft 8 rotate. The torque is transferred to the impeller following on the right side in FIG. 1

Figure 2:
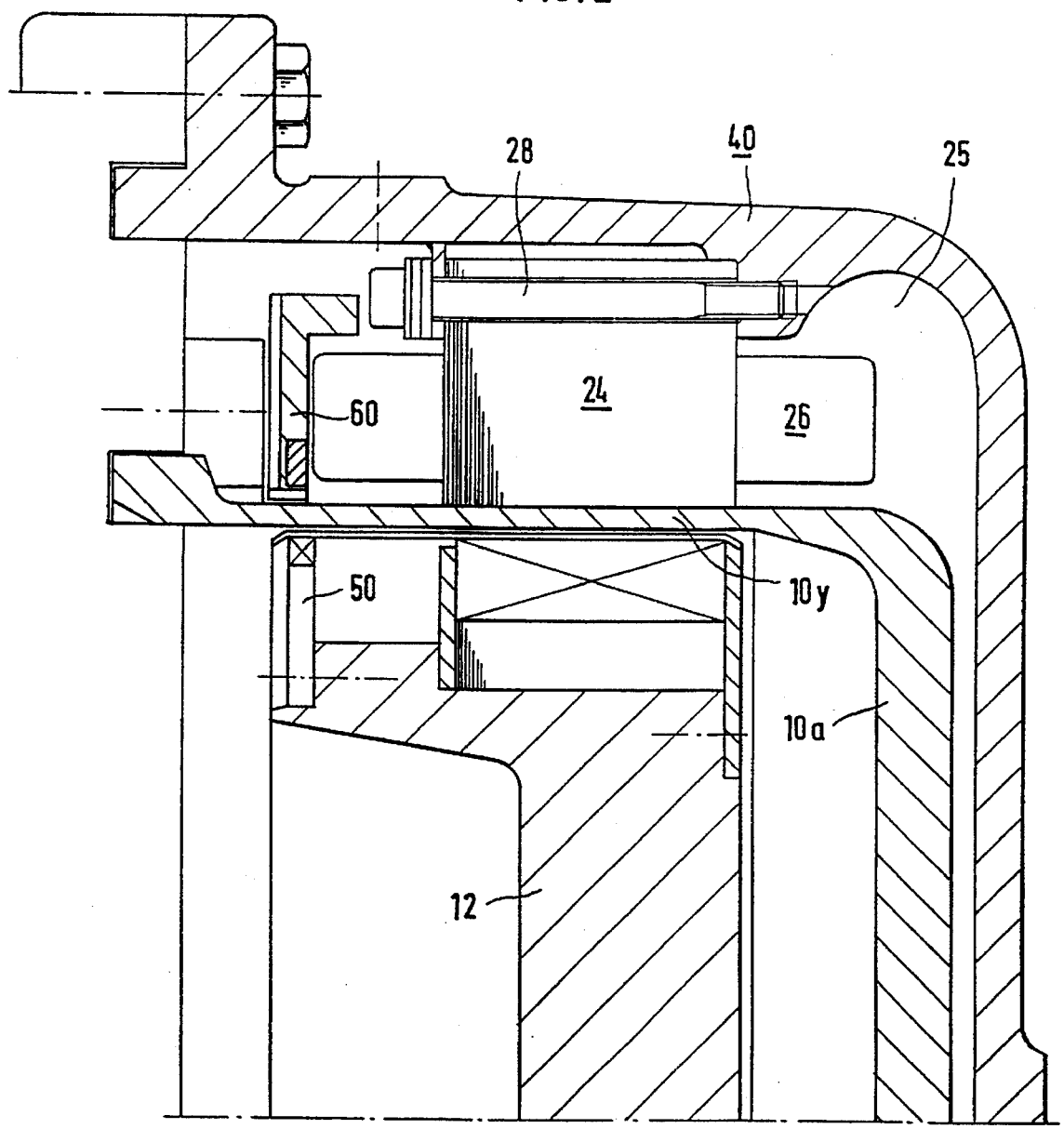
FIG. 2 shows a longitudinal sectional view corresponding to FIG. 1, with a slightly different design of the stator carrier.

FIG. 2 shows a modification very similar to that of FIG. 1, with the difference that a stator carrier 40 is of completely one-piece design and completely encloses the outer surface 10a, 10y of the housing on the side of the motor. FIG. 2 shows furthermore position indicator means. The position means contain a ring 50 coupled to and rotating together with the rotor 12 and carrying permanent magnets as well as a carrier 60 disposed outside radially opposite thereto and equipped with Hall probes past which the permanent magnets move.

Figure 3:
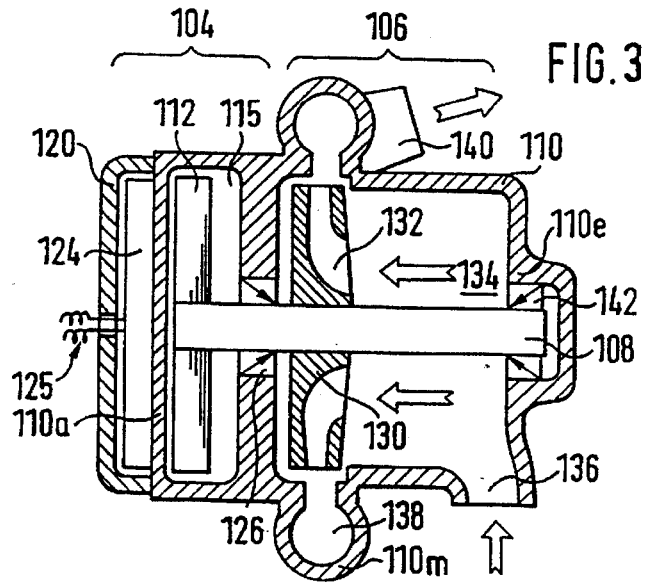
FIG. 3 shows a longitudinal sectional view of a second embodiment of an electric pump.

FIG. 3 shows another embodiment of the invention. Before elucidating the special features of this embodiment, brief reference is to be made to the pump part proper. In FIG. 3, parts similar to FIG. 1 and FIG. 2 are designated by corresponding reference numerals, each increased by "100".

According to FIG. 3 a housing 110 formed in continuous manner in the longitudinal direction contains a shaft 108 supported therein in the region shown to the left in FIG. 3 (approx. between shaft end and shaft center) by means of a radial inner flange of the housing and by means of a shaft seal or sealing ring 126 and moreover in the right-hand end wall 110e of housing 110 by means of a support 142. Approximately centrally on the shaft, there is disposed an impeller 130 in which curved channels 132 are formed, extending from an axially oriented inlet to a radially oriented outlet at the circumference of the impeller 130.

Between the impeller and the right-end wall 110e of the housing, there is disposed a suction chamber 134 into which pumping material can enter in the direction of an arrow via an inlet 136. By rotation of the impeller 130, the pumping material is sucked in the direction of the arrow into the channels 132 and from said channels enters an annular channel 138 formed radially outside of the impeller 130 by a corresponding configuration of the housing at the location 110m.

The fluid is discharged on the delivery side, i.e. from the annular channel 138, through an outlet connection piece 140.

The pump shown only schematically in FIGS. 1 and 2 may be designed there in the pump part 6 in a manner similar to that shown in the pump part 106 in FIG. 3.

The electric motor drive part 104 of the electric pump shown in FIG. 3 differs from the embodiments according to FIG. 1 and FIG. 2.

A rotor 112 consists of an even number of sector-shaped permanent magnets which are oriented axially. The outer end face of rotor 112 is spaced only by a very small distance from the inside of the end face housing wall 110a.

On the outside of housing wall 110a a stator 124 is disposed in a stator holder 120. This stator 124 contains, in a manner not shown in more detail, a disc-shaped coil carrier having stator coils formed thereon.

The current supply means for the stator coils are outlined at 125.

It can be seen that in both embodiments the shaft 8 and 108 respectively, is completely accommodated within the housing. FIG. 3 shows furthermore that the shaft does not leave the housing at any location. The connecting location 136, just as the outlet connection piece 140, has a pipe means connected thereto. Thus, the housing is nowhere open, so that leakage of pumping material cannot occur at any location, either. If pumping material penetrates from suction chamber 134 via the sealing location of the sealing ring 126 into the chamber 115 accommodating, the rotor 112, a sump is formed at the bottom of chamber 115. It is possible to provide a connecting channel, having a valve, between the chamber 115 and the annular channel 138 in order to remove leaking fluid from the chamber 115, as described in principle in the initially mentioned prior application (P 41 11 713).

Figure 4A:
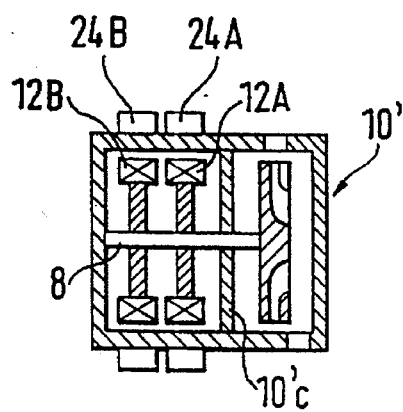
FIG. 4A shows a principle view of an electric pump with two rotors on the shaft carrying the rotors and an impeller, with both rotors being located on the same side of the impeller.

In the embodiments described hereinbefore, the shaft 8 driving the impeller carries a rotor 12 in the chamber shown to the left in FIG. 1 and separated by housing wall 10c. In one of the possible modified embodiments of the invention, the shaft 8 has two rotors disposed thereon one beside the other, as illustrated in FIG. 4A. To the left of housing wall 10c, the shaft 8 has a right-hand rotor 12A and a left-hand rotor 12B disposed thereon. A stator 24A and 24B, respectively, are disposed on the outside of housing 10' in aligned manner therewith.

Figure 4B:
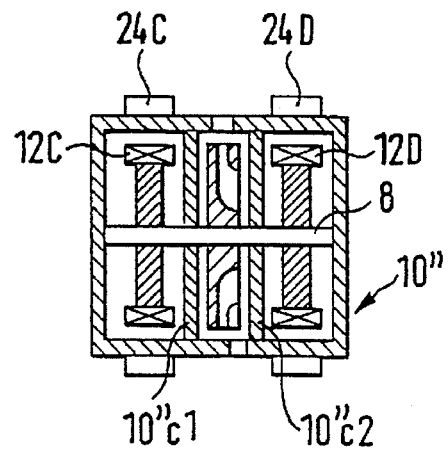
FIG. 4B shows a view similar to that of FIG. 4A, but showing one rotor disposed on one side and the other rotor disposed on the other side of the impeller.

FIG. 4B shows a modified embodiment in which there are also provided two rotors and two stators, however, with the impeller being now located between the rotors. For providing a separation into chambers for the rotors on the one hand and for the impeller on the other hand, housing 10" has two partitions 10"c1 and 10"c2 so as to form a left-hand and a right-hand chamber each receiving one rotor 12C and 12D, respectively. In alignment with these rotors, stators 24C and 25D, respectively, are provided on the outside of housing 10".

In the embodiment according to FIG. 4A, the shaft 8 is supported in the left-hand end side of the housing 10' and in housing wall 10'c. In the embodiment according to FIG. 4B, the shaft is supported in both end sides of housing 10" and in addition in both housing walls 10"c1 and 10"c2.

Figure 5:
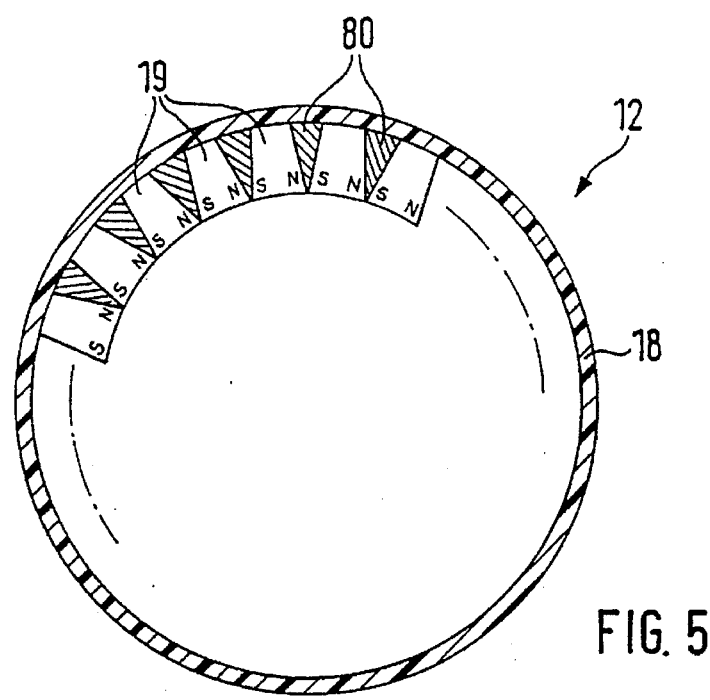
FIG. 5 shows a schematic cross-sectional view of the rotor of the electric pump, illustrating the arrangement of the permanent magnets of the rotor and of flux wedges located between the permanent magnets.

A special feature of the invention resides in the aforementioned specific design of the rotor 12. According to FIG. 5, the permanent magnets 19 of the rotor 12, in a cross-section perpendicular to the axis of rotation of the rotor, are of rectangular, preferably somewhat trapezoidal configuration, with the narrower side of the two parallel sides of the trapezoid being located outside, i.e. in the vicinity of the band 18 according to FIG. 5. The magnets are oriented in circumferential direction, i.e. north pole and south pole are arranged facing each other in adjacent permanent magnets 19.

In the gaps formed between the permanent magnets 19, there are flux guiding wedges 80 of triangular configuration, which on the outside of the rotor, i.e. on the inside of band 18, terminate flush with the outer surfaces of the permanent magnets 19.

Figure 6:
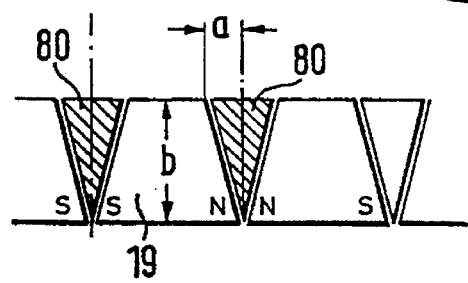
FIG. 6 shows an enlarged cross-sectional view of the permanent magnets and flux wedges depicted in FIG. 5.

As shown in detail in FIG. 6, the permanent magnets 19 have a radial height b, while the area of the flux guiding wedges 80 located on the outside has a width 2a. The cross-sectional area of the permanent magnets 19 and the flux guiding wedges 80 is selected such that the height b is greater than the value a, i.e. greater than half of the width of the flux guiding wedges 80. The effect achieved by this measure is that the force lines deflected by the flux guiding wedges 80 upwardly, i.e. in radial direction, are highly concentrated in the region of the exit areas of the flux guiding wedges 80.

We claim:

1. An electric pump comprising:
    an impeller, a shaft and a motor having at least one permanent magnet rotor and a stator, wherein the impeller is coupled by the shaft to the at least one permanent magnet rotor of the electric motor;
    a hermetically sealed housing in which the shaft is supported and which has openings for delivery side and suction side connections for material to be pumped, wherein the housing has a thickness in a radial direction at a portion thereof between the rotor and the stator which is less than 10 mm;
    wherein the rotor is disposed inside the housing and comprises circumferentially distributed, permanent magnet poles of alternating polarity which are radially spaced from the shaft;
    wherein the stator of the electric motor is disposed outside the housing, is in the form of a ferromagnetic ring axially aligned with the rotor, has coil windings, and is supported outside of the housing; and
    further comprising at least one stator carrier attached to the housing, the stator being mounted in the at least one stator carrier, the at least one stator carrier being of one-piece configuration so as to enclose the housing across an entire circumference thereof in a cup-shaped manner, the at least one stator carrier having a liquid for cooling the at least one stator.

2. A pump according to claim 1, wherein a plurality of rotors is disposed on the shaft axially beside each other, and each rotor has a stator associated therewith.

3. A pump according to claim 2, wherein the motor comprises a plurality of rotors and associated stator parts arranged on the shaft on one side with respect to the impeller.

4. A pump according to claim 2, wherein the motor comprises a plurality of rotors and associated stator parts arranged on the shaft symmetrically on both sides of the impeller.

5. A pump according to claim 1, wherein the housing is made of ceramics or non-ferromagnetic steel of low electrical conductivity.

6. A pump according to claim 5, wherein the housing comprises two parts, a first part disposed near the impeller comprised of cast steel or cast iron, and a second part disposed near the rotor comprised of ceramics or non-ferromagnetic steel of low electrical conductivity.

7. A pump according to claim 4, wherein the permanent magnet poles are surrounded by a band on their outer circumference.

8. A pump according to claim 7, wherein the band is comprised of fiber-reinforced plastics material or non-ferromagnetic steel of low electrical conductivity.

9. A pump according to claim 1, wherein the stator comprises stator parts, and the at least one stator carrier comprises two stator carriers attached to the housing on both sides thereof, respective stator parts being mounted in the two stator carriers.

10. A pump according to claim 1, wherein the housing has at least one radial flange, and the at least one stator carrier is threaded by means of axially directed screws to a respective radial flange.

11. A pump according to claim 1, wherein an outer diameter of the rotor is greater than or at the most equal to the length of the permanent magnet poles of one single rotor in an axial direction.

12. A pump according to claim 1, wherein the diameter of the impeller or of the housing on the pump side is approximately equal to the outside diameter of the stator carrier.

13. A pump according to claim 1, wherein the permanent magnet poles on the rotor are constituted by radially magnetized, highly coercive permanent magnets of the rare earths metal type, with a ferromagnetic return path disposed radially inside.

14. (Amended) A pump according to claim 1, wherein the permanent magnet poles on the rotor are constituted by circumferentially magnetized, highly coercive permanent magnets of the rare earths metal type and ferromagnetic flux wedges according to the flux collecting principle.

15. A pump according to claim 1, wherein the stator currents within the coil windings of the stator are electronically commutated.

16. A pump according to claim 1, wherein the power and the speed of the pump are infinitely variable within the operating range thereof.

17. An electric pump comprising:
    an impeller, a shaft and a motor having at least one permanent magnet rotor and a stator, wherein the impeller is coupled by the shaft to the at least one permanent magnet rotor of the electric motor;
    a hermetically sealed housing in which the shaft is supported and which has openings for delivery side and suction side connections for material to be pumped;
    wherein the rotor is disposed inside the housing and comprises a number of sector-shaped permanent magnet poles configured in the form of a disc and having an axial direction of magnetization;
    wherein the stator of the electric motor is disposed outside the housing on a face side of the housing and has a number of coil windings disposed substantially in one plane, the number of coil windings corresponding substantially to the number of poles of the rotor; and
    further comprising at least one stator carrier attached to the housing, the stator being mounted in the at least one stator carrier, the at least one stator carrier being of one-piece configuration so as to enclose the housing across an entire circumference thereof in a cup-shaped manner, the at least one stator carrier having a liquid for cooling the at least one stator.

* * * * *